(12) United States Patent
Mihara et al.

(10) Patent No.: US 9,091,856 B2
(45) Date of Patent: Jul. 28, 2015

(54) OPTICAL REFLECTING ELEMENT

(71) Applicant: PANASONIC CORPORATION, Osaka (JP)

(72) Inventors: Kensuke Mihara, Osaka (JP); Akira Kurozuka, Osaka (JP); Shinsuke Nakazono, Osaka (JP); Soichiro Hiraoka, Hyogo (JP); Yuta Yamamoto, Osaka (JP); Toshiaki Horie, Osaka (JP); Kazuki Komaki, Osaka (JP)

(73) Assignee: PANASONIC INTELLCTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/344,045

(22) PCT Filed: Sep. 21, 2012

(86) PCT No.: PCT/JP2012/005997
§ 371 (c)(1),
(2) Date: Mar. 10, 2014

(87) PCT Pub. No.: WO2013/046612
PCT Pub. Date: Apr. 4, 2013

(65) Prior Publication Data
US 2014/0226194 A1 Aug. 14, 2014

(30) Foreign Application Priority Data

Sep. 30, 2011 (JP) ................................. 2011-216345

(51) Int. Cl.
*G02B 26/08* (2006.01)
*G02B 26/10* (2006.01)

(52) U.S. Cl.
CPC .................................... *G02B 26/105* (2013.01)

(58) Field of Classification Search
CPC ............. G02B 26/0825; G02B 26/105; G02B 26/0841; G02B 7/1821; G02B 26/0833; G02B 26/085; G02B 26/0858
USPC .......... 359/198.1–199.4, 200.6–200.8, 221.2, 359/223.1–224.2, 226.1–226.2
See application file for complete search history.

(56) References Cited

U.S. PATENT DOCUMENTS

| 7,639,413 B2 * | 12/2009 | Nishikawa et al. ........ 359/224.1 |
| 2002/0149072 A1 | 10/2002 | Mutoh et al. |
| 2003/0016428 A1 | 1/2003 | Kato et al. |
| 2005/0243396 A1 | 11/2005 | Fujii et al. |
| 2010/0238533 A1 | 9/2010 | Nakamura et al. |

FOREIGN PATENT DOCUMENTS

| JP | 2002-131685 A | 5/2002 |
| JP | 2002-372681 A | 12/2002 |

(Continued)

OTHER PUBLICATIONS

International Search Report issued in International Application No. PCT/JP2012/005997 with Date of mailing Nov. 6, 2012, with English Translation.

*Primary Examiner* — James Phan
(74) *Attorney, Agent, or Firm* — McDermott Will & Emery LLP

(57) ABSTRACT

An optical reflecting device includes a mirror, a frame connected to the mirror, and a driver beam configured to vibrate to rotate the mirror about a rotation axis. Rigidity of the frame is higher than rigidity of the mirror. The rotation axis is perpendicular to a line that connects a first connecting part to a second connecting part. This optical reflecting device can suppress a dynamic warp of the mirror.

9 Claims, 14 Drawing Sheets

(56) References Cited

FOREIGN PATENT DOCUMENTS

| JP | 2003-131161 A | 5/2003 |
| JP | 2005-148459 A | 6/2005 |
| JP | 2005-308863 A | 11/2005 |
| JP | 2006-293176 A | 10/2006 |
| JP | 2007-075978 A | 3/2007 |
| JP | 2009-210955 A | 9/2009 |
| JP | 2010-217648 A | 9/2010 |

* cited by examiner

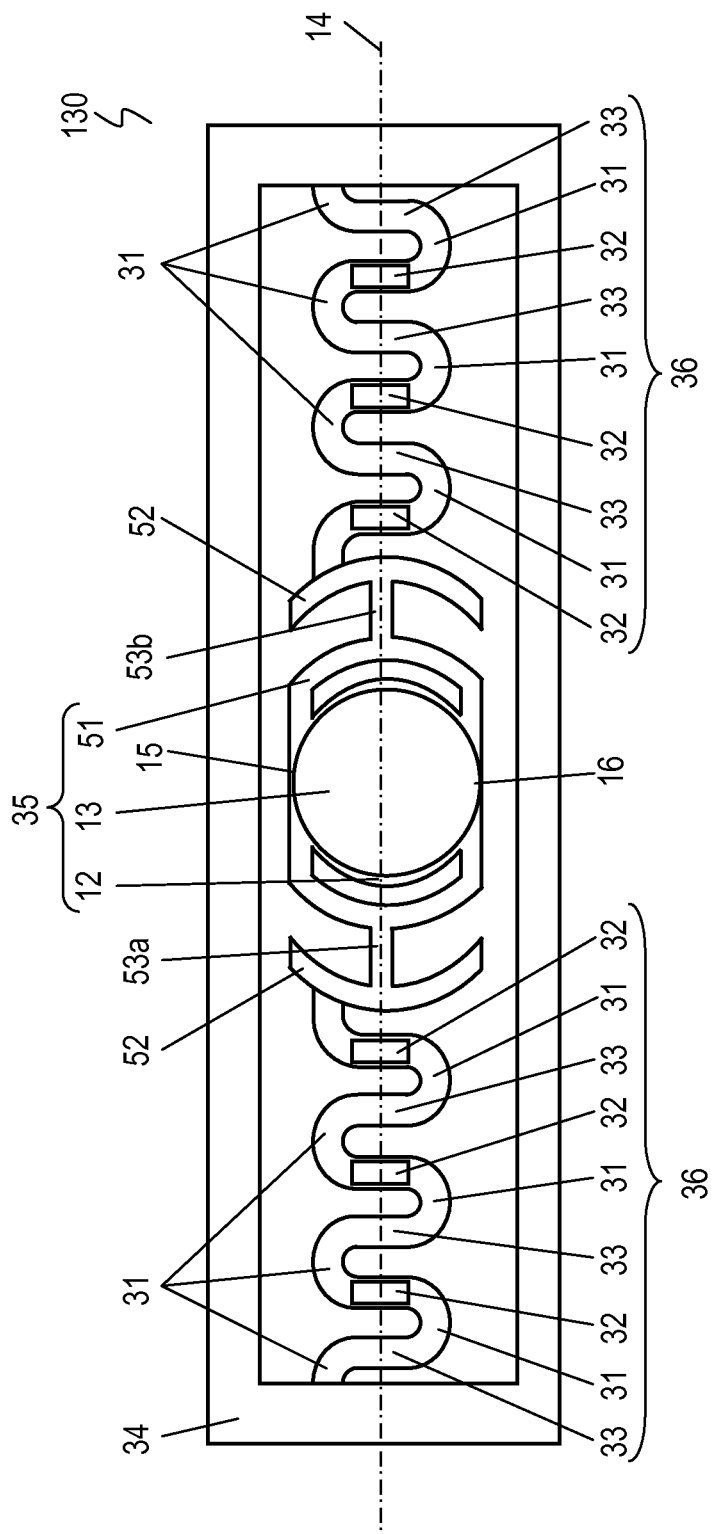

OPTICAL REFLECTING ELEMENT

RELATED APPLICATIONS

This application is the U.S. National Phase under 35 U.S.C. §371 of International Application No. PCT/JP2012/005997, filed on Sep. 21, 2012, which in turn claims the benefit of Japanese Application No. 2011-2116345, filed on Sep. 30, 2011, the disclosures of which Applications are incorporated by reference herein.

TECHNICAL FIELD

The present invention relates to an optical reflecting device used in, e.g. optical-reflecting type projectors using a laser beam.

BACKGROUND ART

An on-vehicle radar and a projection-type display device scanning a light flux emitted from a light source, such as a laser, are in practical use. A conventional optical reflecting device includes an outer frame, an inner frame separated from the outer frame across a groove, an outer spindle that is disposed in this groove and supports the inner frame inside the outer frame, a mirror separated from the inner frame via a groove, an inner spindle that is disposed in this groove and supports the mirror inside the inner frame, an outer piezoelectric diaphragm that has one end connected to the outer frame and the other end connected to the outer spindle, and an inner piezoelectric diaphragm that has one end connected to the inner frame and the other end connected to the inner spindle. The mirror vibrating about the outer spindle and the inner spindle causes the reflected light of the light entering the mirror two-to dimensionally scan a screen to display an image on the screen.

An optical reflecting device similar to this optical reflecting device is disclosed in, e.g. Patent Literature 1.

A high-definition image using this scanning optical reflecting device requires a large-size and high-speed mirror. However, the increase in size and speed provides the mirror with a dynamic warp during driving. This dynamic warp causes the mirror to be a concave mirror or a convex mirror. Thus, the laser beam reflected on the mirror spreads and prevents an image from being displayed accurately, hence displaying a defocused image.

The dynamic warp is caused by an inertial force applied to the mirror. Therefore, as the distance from the rotation axis increases, the inertial force increases, accordingly increasing the dynamic warp. The mirror has an axis about which the mirror vibrates. The distribution of the dynamic warp depends on a mechanism for supporting the mirror. In other words, the distribution of the dynamic warp depends on a balance between the inertial force and the supporting mechanism.

Patent Literature 2 discloses a structure in which an aperture is provided between the center and the outer periphery of the mirror for preventing the dynamic warp from transferring from the outer periphery to the center. In the outer periphery of the mirror, a larger dynamic warp occurs due to a stress concentrating at a connecting position between the outer peripheries to a torsion bar, which transmits a drive force for vibration, than in the periphery. In Patent Literature 2, the dynamic warp caused by the stress concentration is prevented from transferring to the center.

However, when a connection part between the outer periphery and the center becomes small in order to inhibit the dynamic warp of the outer periphery from transferring to the center, the torque for drive concentrates in the periphery of the connection part and causes the dynamic warp at the center.

CITATION LIST

Patent Literature

Patent Literature 1: Japanese Patent Laid-Open Publication No. 2005-148459
Patent Literature 2: Japanese Patent No. 3926552

SUMMARY

An optical reflecting device includes a mirror, a frame connected to the mirror, and a driver beam configured to vibrate to rotate the mirror about a rotation axis. Rigidity of the frame is higher than rigidity of the mirror. The rotation axis is perpendicular to a line that connects a first connecting part to a second connecting part.

This optical reflecting device can suppress a dynamic warp of the mirror.

BRIEF DESCRIPTION OF DRAWINGS

FIG. 13 is a plan view of an optical reflecting device in accordance with Exemplary Embodiment 3 of the invention.

DETAIL DESCRIPTION OF PREFERRED EMBODIMENTS

Exemplary Embodiment 1

Figure 1:
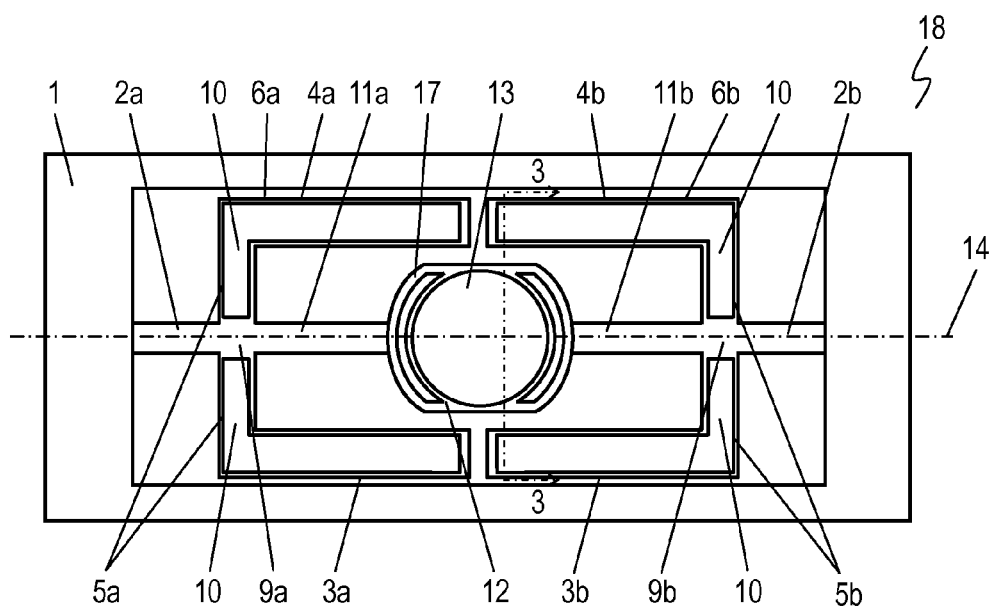
FIG. 1 is a plan view of an optical reflecting device in accordance with Exemplary Embodiment 1 of the present invention.

FIG. 1 is a plan view of optical reflecting device 18 in accordance with Exemplary Embodiment 1 of the present invention. Optical reflecting device 18 includes supporter 1 and two tuning-fork vibrators 6a and 6b. Support 1 has a rectangular frame shape. One end of each of driver beams 2a and 2b is fixed to supporter 1. One end of each of driver beams 11a and 11b is fixed to respective one of vibration centers 9a and 9b of tuning-fork vibrators 6a and 6b. The other end of each of driver beams 11a and 11b is connected to movable plate 12 including mirror 13 configured to reflect light, such as a laser beam. Tuning-fork vibrator 6a includes arms 3a and 4a and coupler 5a for coupling arms 3a and 4a to each other. Tuning-fork vibrator 6b includes arms 3b and 4b and coupler 5b for coupling arms 3b and 4b to each other. Tuning-fork vibrators 6a and 6b are located at positions opposite to each other with respect to movable plate 12. Vibration centers 9a and 9b are positioned on rotation axis 14 of movable plate 12.

Figures 2A, 2B:
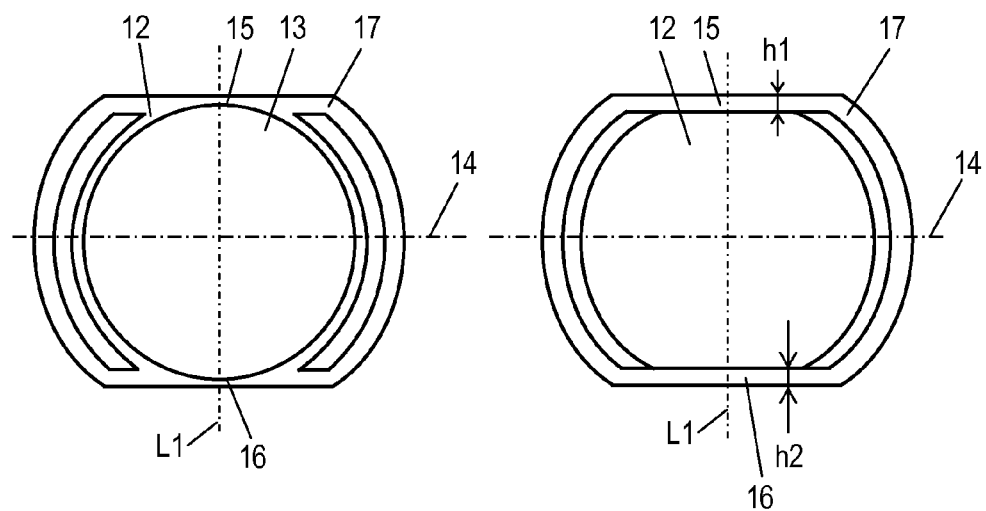
FIG. 2A is a front view of a movable plate of the optical reflecting device in accordance with Embodiment 1.
FIG. 2B is a rear view of the movable plate shown in FIG. 2A.

FIGS. 2A and 2B are a front view and a rear view of movable plate 12, respectively. Movable plate 12 includes mirror 13 and frame 17 for supporting mirror 13 at connecting parts 15 and 16. Frame 17 is supported by driver beams 11a and 11b. Line L1 that connects connecting parts 15 and 16 is perpendicular to rotation axis 14. The thickness of frame 17 is greater than that of mirror 13. Mirror 13 is connected to frame 17 locally at connecting parts 15 and 16, and is not connected to frame 17 on rotation axis 14 to be separated from frame 17 on rotation axis 14. As shown also in FIG. 1, a pair of driver beams 2a and 2b are connected to frame 17 on rotation axis 14.

Figure 3:
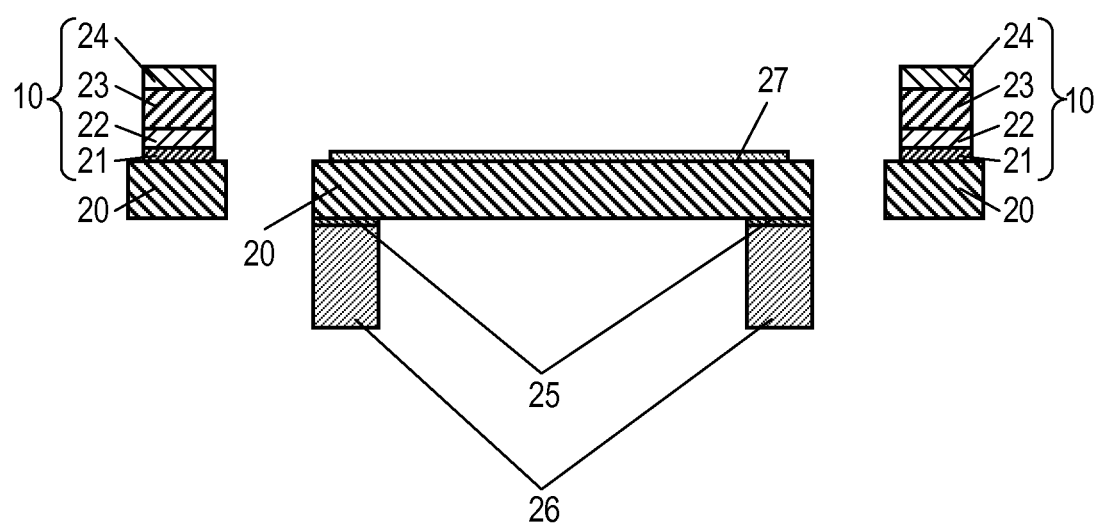
FIG. 3 is a sectional view of the optical reflecting device at line 3-3 shown in FIG. 1.

FIG. 3 is a sectional view of optical reflecting device 18 at line 3-3 shown in FIG. 1. Optical reflecting device 18 is made of an elastic material, such as silicon, having elasticity, mechanical strength, and a high Young's modulus.

Arms 3a, 3b, 4a, and 4b are made of substrate 20 made of, e.g. silicon. Piezoelectric actuator 10 for causing warp-vibration is provided on a surface of at least one of arms 3a, 3b, 4a, and 4b. Substrate 20 is made of elastic material, such as silicon, having elasticity, mechanical strength, and a high Young's modulus. Piezoelectric actuator 10 includes silicon oxide film 21 provided on substrate 20, lower electrode layer 22 provided on silicon oxide film 21, piezoelectric body layer 23 provided on lower electrode layer 22, and upper electrode layer 24 provided on piezoelectric body layer 23.

According to Embodiment 1, lower electrode layer 22 is made of platinum, upper electrode layer 24 is made of gold, and piezoelectric body layer 23 is made of piezoelectric material, such as lead zirconate titanate ($Pb(Zr_x,Ti_{1-x})O_3$, $x=0.525$). These layers can be formed at once by a thin film process, such as vapor deposition, sol-gel, chemical vapor deposition (CVD), or sputtering method, and can be accurately processed to form a fine pattern by an etching technology using a photolithographic technique.

Movable plate 12 is also made of substrate 20. Frame 17 which is thicker than mirror 13 includes silicon oxide film 25 provided on a lower surface of substrate 20 and silicon body 26 provided on a lower surface of silicon oxide film 25. A flat substrate including substrate 20, silicon oxide film 25, and silicon body 26 which are unitarily formed is etched with fluorine-based gas from a front surface of the flat substrate to process substrate 20, and then, is etched with fluorine-based gas from a rear surface of the flat substrate similarly to the front surface to provide silicon body 26 with an uneven thickness. Metal thin film 27 mainly made of silver is formed on a surface of mirror 13 by a thin film process, such as vapor deposition or sputtering. Metal thin film 27 is configured to reflect light, such as a laser beam.

A method of driving optical reflecting device 18 including piezoelectric actuator 10 will be described below.

Figure 4:
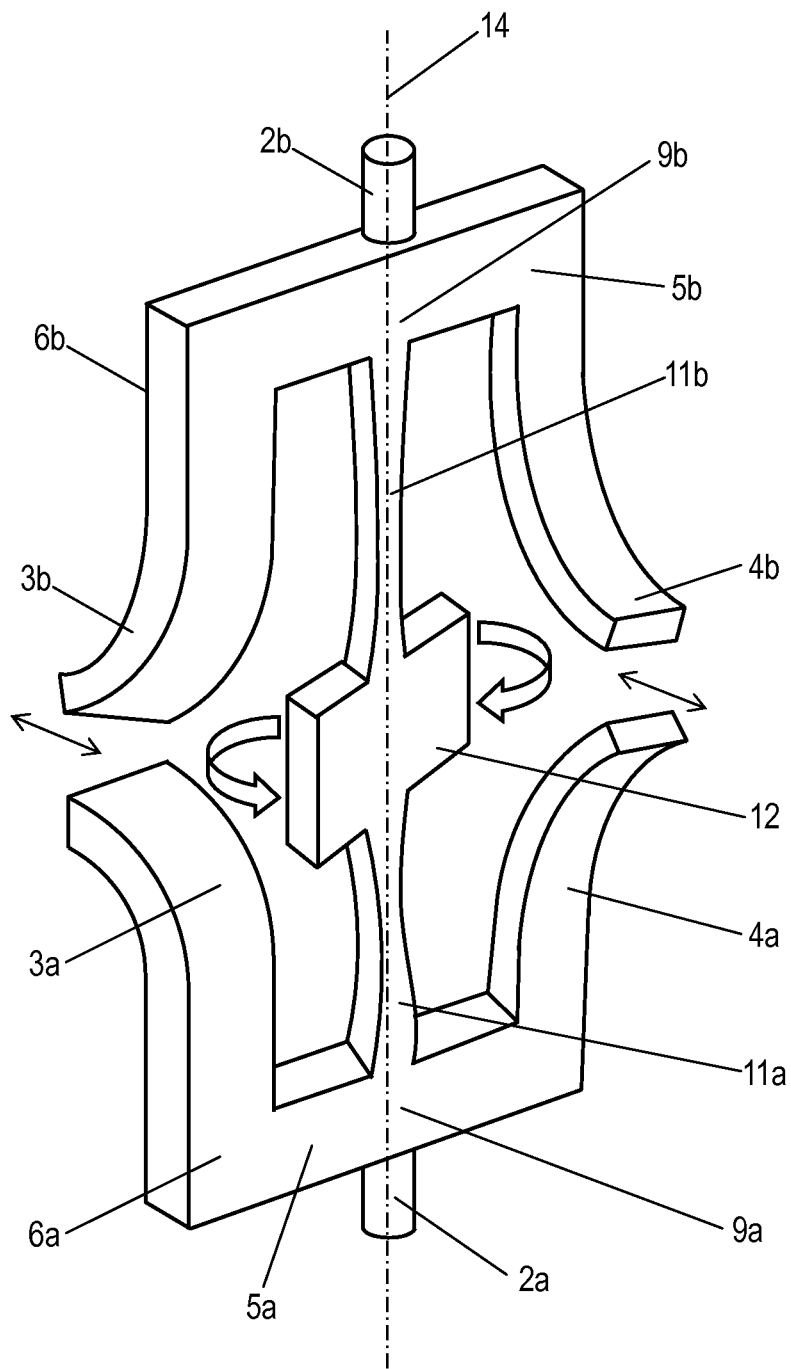
FIG. 4 is a perspective view of the optical reflecting device in accordance with Embodiment 1 for illustrating the driving of the optical reflecting device.

FIG. 4 is a perspective view of optical reflecting device 18 for illustrating an operation of optical reflecting device 18. Tuning-fork vibrators 6a and 6b are aligned on rotation axis 14 of movable plate 12 and located at positions opposite to each other with respect to movable plate 12. A voltage is applied to piezoelectric actuator 10 so that arms 3a and 3b of tuning-fork vibrators 6a and 6b may warp in the same direction while arms 4a and 4b may warp in the same direction. The warping direction of arms 3a and 3b is opposite to that of arms 4a and 4b. Driver beams 11a and 11b and movable plate 12 constitute a torsional vibrator. Vibration energy of tuning-fork vibrators 6a and 6b causes the torsional vibrator to vibrate torsionally. This torsional vibration causes movable plate 12 to vibrate to rotate repetitively.

In optical reflecting device 18 according to Embodiment 1 in which the torsional vibration of driver beams 11a and 11b extending on rotation axis 14 causes a torsional vibration of mirror 13, the dynamic warp of mirror 13 in both directions parallel and rectangular to rotation axis 14 can be simultaneously suppressed.

Figure 5A:
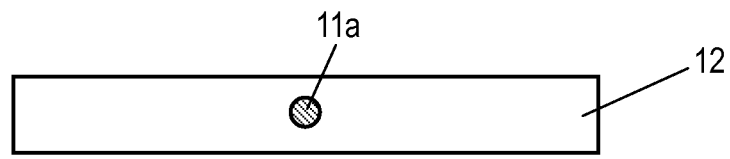
FIG. 5A is a side view of a mirror of the optical reflecting device in accordance with Embodiment 1.
Figure 5B:
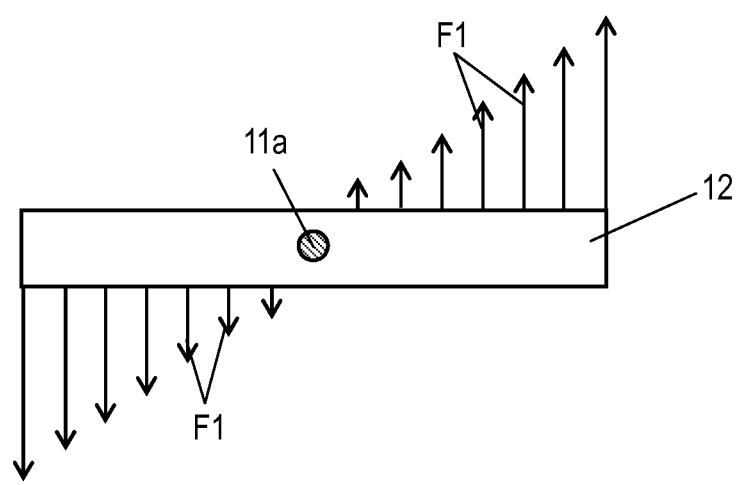
FIG. 5B is a side view of the mirror of the optical reflecting device in accordance with Embodiment 1.
Figure 5C:
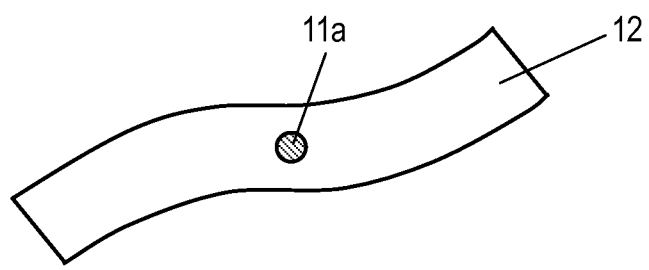
FIG. 5C is a side view of the mirror of the optical reflecting device in accordance with Embodiment 1.

First, an effect of suppressing the dynamic warp in the direction rectangular to rotation axis 14 will be described. FIGS. 5A to 5C are side views of mirror 13 seen along a direction of rotation axis 14. When mirror 13 rotates about rotation axis 14, as shown in FIG. 5B, portions of mirror 13 receive inertial force F1 proportional to distances to the portions from rotation axis 14. Inertial force F1 rotates and dynamically warps mirror 13, as shown in FIG. 5C. Therefore, in a circular mirror such as mirror 13, both ends of mirror 13 that are farthest from rotation axis 14 and have the largest inertial force F1 are connected to and supported by frame 17 having a rigidity higher than that of mirror 13 at connecting parts 15 and 16, so that the dynamic warp of mirror 13 can be suppressed. Increase of the thickness of frame 17 can increase the rigidity of frame 17.

Next, an effect of suppressing the dynamic warp in the direction parallel to rotation axis 14 will be described. The dynamic warp of portions of mirror 13 in the direction parallel to rotation axis 14 is produced since the distances to the portions from the support point at which mirror 13 is supported are different from each other while the distances to the portions from rotation axis 14 are identical to each other so that inertial forces F1 may be identical to each other in a direction parallel to rotation axis 14.

Figure 6A:
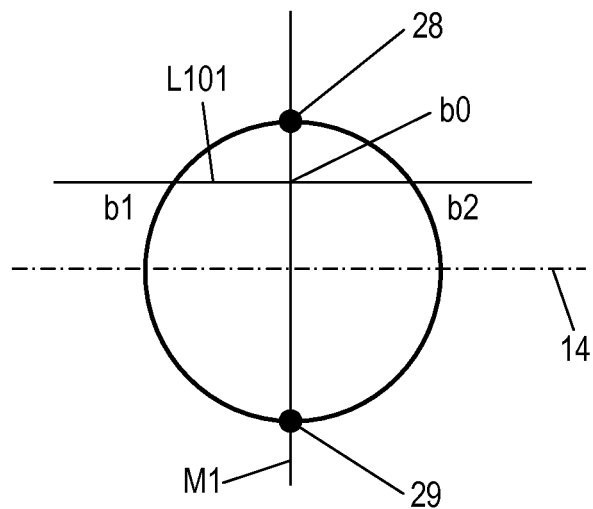
FIG. 6A is a schematic view of the mirror of the optical reflecting device in accordance with Embodiment 1.
Figure 6B:
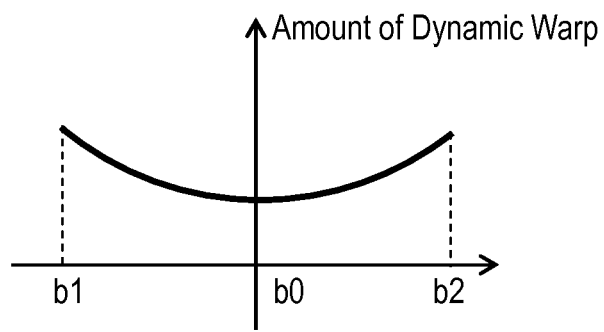
FIG. 6B shows a diagram warp of the mirror shown in FIG. 6A.

FIG. 6A is a schematic view of mirror 13. The center point of connecting part 15 on an outer edge of mirror 13 is defined as support point 28, and the center point of connecting part 16 on the outer edge of mirror 13 is defined as support point 29. Mirror 13 has support points 28 and 29. Rotation axis 14 is perpendicular to a line extending from support point 28 to support point 29. FIG. 6B shows the distribution of the amount of the dynamic warp of mirror 13 on line L101 shown in FIG. 6A. As shown in FIG. 6B, mirror 13 has ends b1 and b2 on line L101. Line L101 crosses, at intersection point b0, line M1 extending from support point 28 to support point 29. The amount of the dynamic warp on line L101 becomes smallest at intersection point b0. The distances to portions of mirror 13 from support points 28 and 29 increase as the distances to portions of mirror 13 from intersection point b0 increase, so that the amount of the dynamic warp may increase as the distances from intersection point b0 increase.

Figure 7A:
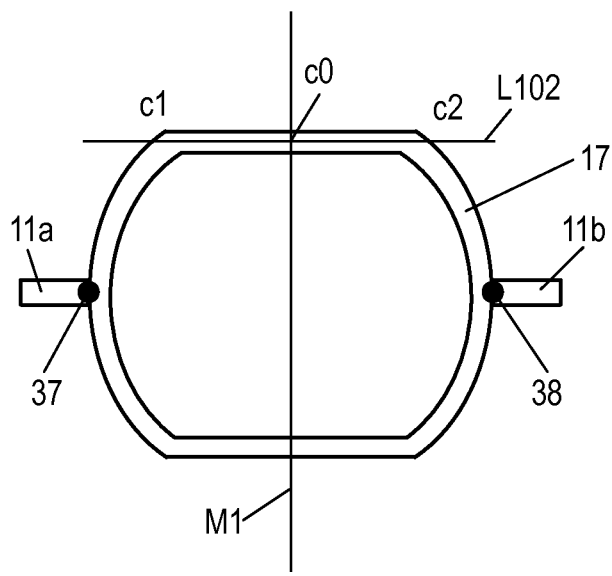
FIG. 7A is a schematic view of a frame of the optical reflecting device in accordance with Embodiment 1.
Figure 7B:
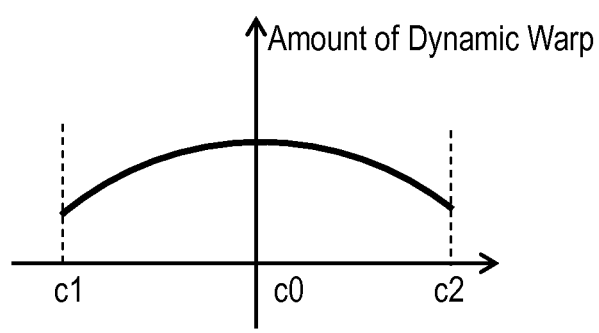
FIG. 7B shows a dynamic warp of the frame shown in FIG. 7A.

FIG. 7A is a schematic view of frame 17. The center point of the connecting part at which frame 17 is connected to driver beam 11a is defined as support point 37, and the center point of the connecting part at which frame 17 is connected to driver beam 11b is defined as support point 38. FIG. 7B shows the distribution of the amount of the dynamic warp of frame 17 on line L102 shown in FIG. 7A. Frame 17 has ends c1 and c2 on line L102, and the line extending from end c1 to end c2 has midpoint c0 between ends c1 and c2. On line L102, the amount of the dynamic warp becomes largest at midpoint c0, and decreases as distances from midpoint c0 increase.

The profile of the distribution of the amount of the dynamic warp shown in FIG. 6B projects downward. The profile of the distribution of the amount of the dynamic warp shown in FIG. 7B projects upward, being reverse to the profile of the distribution shown of FIG. 6B. Frame 17 is connected to mirror 13 such that frame 17 partially overlaps mirror 13, as shown in FIGS. 2A and 2B. The width within which frame 17 overlaps mirror 13 is selected such that the dynamic warp of frame 17 cancels the dynamic warp of mirror 13, hence suppressing the dynamic warp parallel to rotation axis 14.

For example, an optical reflecting device of a comparative example includes mirror 13 having a thickness of 100 µm and a diameter of 1.1 mm and driver beams 11a and 11b connected directly to mirror 13 without frame 17. In this comparative example, the amount of the dynamic warp of mirror 13 is 590 nm. In contrast, in optical reflecting device 18 shown in FIGS. 2A and 2B including driver beams 11a and 11b are coupled to each other via frame 17, mirror 13 has a thickness of 100 µm and a diameter of 1.1 mm, frame 17 has a thickness of 200 µm, connecting parts 15 and 16 have a thickness of 200 µm similarly to frame 17. Connection width h1 between frame 17 and the mirror in a direction of line L1 is 50 µm. Connection width h2 between frame 17 and mirror 13 in a direction of line L1 is 50 µm. The amount of the dynamic warp of mirror 13 of optical reflecting device 18 is 91 nm. Thus, the amount of the dynamic warp of optical reflecting device 18 according to Embodiment 1 is 85% smaller than that of the comparative example.

In optical reflecting device 18, a dynamic warp does not produced in mirror 13, so that the light reflected on mirror 13 may not spread and display a clear image accurately on a screen.

Figure 8A:
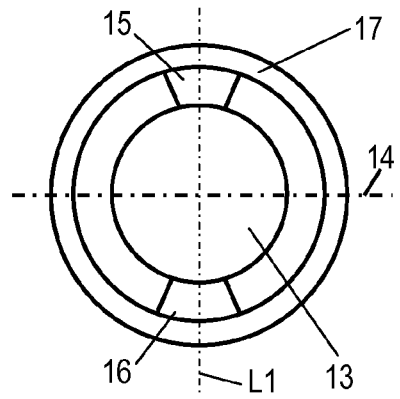
FIG. 8A is a schematic view of a mirror and a frame of the optical reflecting device in accordance with Embodiment 1.
Figure 8B:
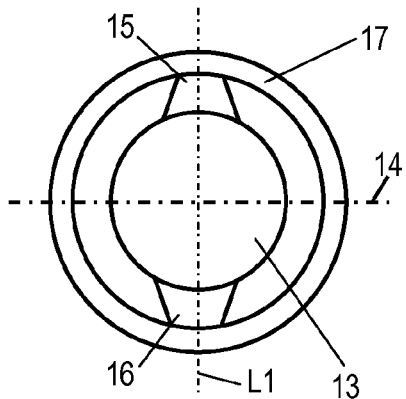
FIG. 8B is a schematic view of a mirror and a frame of the optical reflecting device in accordance with Embodiment 1.
Figure 8C:
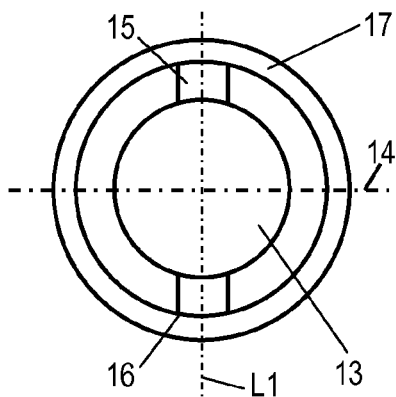
FIG. 8C is a schematic view of a mirror and a frame of the optical reflecting device in accordance with Embodiment 1.
Figure 8D:
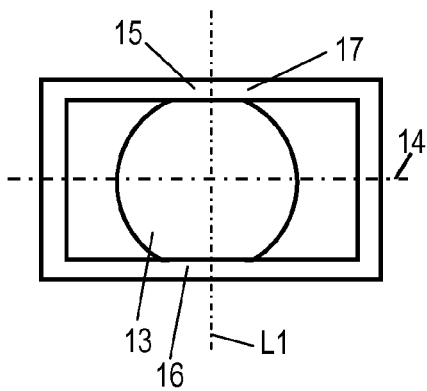
FIG. 8D is a schematic view of a mirror and a frame of the optical reflecting device in accordance with Embodiment 1.
Figure 8E:
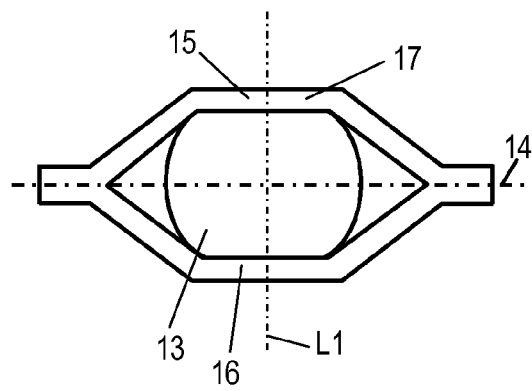
FIG. 8E is a schematic view of a mirror and a frame of the optical reflecting device in accordance with Embodiment 1.

In optical reflecting device 18 producing a torsional vibration of the beams on rotation axis 14 and producing a torsional vibration of mirror 13, frame 17 supported by the beams on rotation axis 14 is connected to mirror 13 via connecting parts 15 and 16. Rotation axis 14 is perpendicular to line L1 extending from connecting part 15 to connecting part 16. This arrangement allows the distribution of the dynamic warp of frame 17 to be reverse to that of mirror 13. In other words, frame 17 is connected to mirror 13 such that the distribution of the dynamic warp of frame 17 is reverse to that of mirror 13, thereby cancelling the dynamic warps. FIGS. 8A to 8E are schematic views of frame 17 and mirror 13 that are connected to each other such that the dynamic warp distribution of frame 17 cancels that of mirror 13. As shown in FIGS. 8A and 8B, the connection width between frame 17 and each of connecting parts 15 and 16 may be different from the connection width between mirror 13 and each of connecting parts 15 and 16. Frame 17 does not necessarily have a circular shape identical to the circular outer edge of mirror 13. Frame 17 may have a rectangular shape shown in FIG. 8D, or may have a hexagonal shape shown in FIG. 8E.

As the thickness of frame 17 increases, the rigidity of frame 17 increases and mirror 13 is supported more firmly, hence suppressing the effect of suppressing the dynamic warp more. In this case, however, an effect of cancelling the dynamic warp of mirror 13 decreases, the warp of frame 17 produces the warp of mirror 13, thus decreasing the effect of suppressing the dynamic warp. In this case, the weight of movable plate 12 including frame 17 and mirror 13 is large, hence decreasing the resonance frequency and decreasing the driving efficiency. Therefore, in the case that mirror 13 has a thickness of 100 µm and is made of Si as the substrate, the width and thickness of frame 17 are 50 µm and 200 µm, respectively, the dynamic warp of frame 17 cancels the dynamic warp of mirror 13, and movable plate 12 can vibrate efficiently. According to the structure, such as the composition and thickness of substrate 20, of optical reflecting device 18, the width and thickness of the frame may be adjusted so as to exhibit the effect of canceling the warps effectively.

As the thickness of mirror 13 increases, the effect of suppressing the dynamic warp of mirror 13 can be produced more easily. However, in order to produce, by increasing the thickness of mirror 13, an effect that is equivalent to the effect of suppressing the dynamic warp of frame 17, the thickness of mirror 13 is about 500 µm. This increases the weight of mirror 13 and decrease the resonance frequency and driving efficiency. Therefore, if the thickness of mirror 13 is increased to suppress the dynamic warp, the performance of piezoelectric actuator 10 is reduced. In optical reflecting device 18 according to Embodiment 1, the dynamic warp can be suppressed without changing the thickness of mirror 13. Therefore, optical reflecting device 18 suppresses the dynamic warp efficiently while maintaining the resonance frequency and driving efficiency.

In optical reflecting device 18 according to Embodiment 1, the dynamic warp of the entire surface of mirror 13 can be suppressed. In the case that the point farthest from rotation axis 14 is an edge of mirror 13, as the width of mirror 13 in the direction perpendicular to rotation axis 14 increases, the distance from rotation axis 14 to the edge of mirror 13 increases, accordingly increasing the moment of inertia of mirror 13. Therefore, in the case that mirror 13 extends in the direction perpendicular to rotation axis 14, the resonance frequency and driving efficiency decrease more significantly than the case that mirror 13 extends in the direction parallel to rotation axis 14. In optical reflecting device 18 according to Embodiment 1, mirror 13 does not extend in the direction perpendicular to rotation axis 14, so that the dynamic warp of the whole surface of mirror 13 can be suppressed efficiently while maintaining the resonance frequency and driving efficiency.

The effect of cancelling the dynamic warp of mirror 13 due to the reverse relationship between the distribution of the dynamic warp of mirror 13 and that of frame 17 can be produced most effectively by allowing frame 17 to be connected to mirror 13 to cause line L1 extending from connecting part 15 to connection parts 16 of movable plate 12 to be perpendicular to rotation axis 14. However, even when line L1 extending from connecting part 15 to connecting part 16 is not perpendicular to rotation axis 14, the effect of suppressing the dynamic warp can be produced when connecting parts 15 and 16 are disposed in the direction perpendicular to rotation axis 14. Especially, if connecting parts 15 and 16 are symmetrical to each other with respect to rotation axis 14, the effect of suppressing the dynamic warp can be produced more effectively.

This effect can be produced similarly in the case where a method for driving mirror 13 with arms 3a, 3b, 4a, and 4b is different from a method of driving movable plate 12.

As discussed above, optical reflecting device 18 includes mirror 13, frame 17 connected to mirror 13 at connecting parts 15 and 16 opposite to each other to locate mirror 13 between connecting parts 15 and 16, and a pair of driver beams 11a and 11b connected to frame 17 at positions opposite to each other to locate frame 17 between the positions. Driver beams 11a and 11b vibrate to cause mirror 13 to rotate about rotation axis 14. The rigidity of frame 17 is higher than that of mirror 13. Rotation axis 14 is perpendicular to line L1 extending from connecting part 15 to connecting part 16.

Mirror 13 may be formed unitarily with frame 17 via connecting parts 15 and 16.

Mirror 13 has a front surface for reflecting light and a rear surface opposite to the front surface. Reinforcing rib 40 may be disposed on the rear surface of mirror 13. The pair of driver beams 11a and 11b are connected to frame 17.

Figure 9:
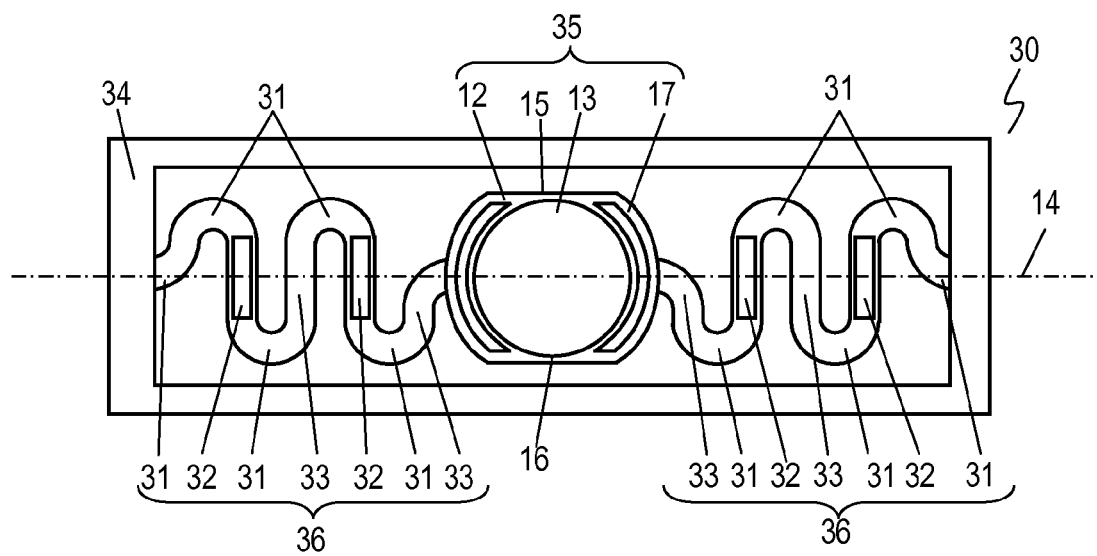
FIG. 9 is a plan view of another optical reflecting device in accordance with Embodiment 1.

FIG. 9 is a plan view of another optical reflecting device 30 in accordance with Embodiment 1. In FIG. 9, components identical to those of optical reflecting device 18 of FIG. 1 are denoted by the same reference numerals. Optical reflecting device 30 shown in FIG. 9 includes driver beams 36 having a meander shape, instead of driver beams 2a, 2b, 11a, and 11b having a straight shape of optical reflecting device 18 shown in FIG. 1. Optical reflecting device 30 shown in FIG. 9 includes supporter 34 having a rectangular frame shape, a pair of driver beams 36 supported by supporter 34, and movable plate 35 that is coupled to and supported by inner ends of driver beams 36 on rotation axis 14. The inner ends of driver beams 36 are connected to frame 17 of movable plate 35 on rotation axis 14. Respective outer ends of the pair of driver beams 36 are connected to parts on the inner edge of supporter 34. Each of driver beams 36 includes plural bent sections 31 and plural diaphragms 33 that are connected alternately to each other to form the meander shape. Piezoelectric actuator 32 is disposed at every other diaphragm 33 out of the plural diaphragms 33. Movable plate 35 includes frame 17 and mirror 13, similarly to movable plate 12 of optical reflecting device 18 shown in FIG. 1.

Next, the composition of optical reflecting device 30 will be described. Optical reflecting device 30 includes a substrate that is made of elastic material, such as silicon, having elasticity, mechanical strength, and high Young's modulus. Similarly to piezoelectric actuator 10 shown in FIG. 3, piezoelectric actuator 32 includes silicon oxide film 21 provided on substrate 20 made of silicon, lower electrode layer 22 provided on silicon oxide film 21, piezoelectric layer 23 provided on lower electrode layer 22, and upper electrode layer 24 provided on piezoelectric body layer 23.

Figure 10:
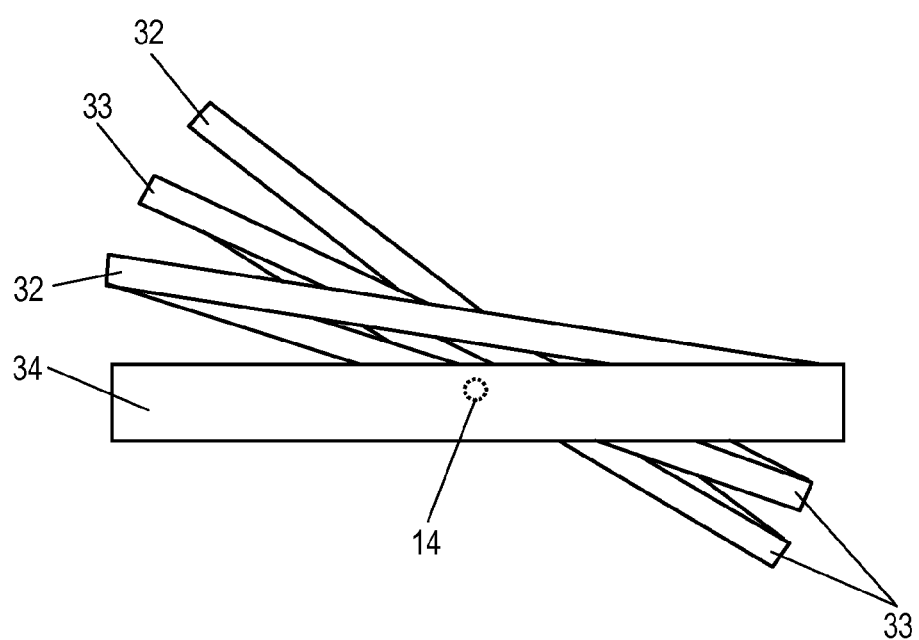
FIG. 10 shows a vibration of a driver beam of the optical reflecting device shown in FIG. 9.

Next, an operation of optical reflecting device 30 will be described below. FIG. 10 shows the vibration of driver beam 36.

An alternating-current (AC) voltage of a resonance frequency of optical reflecting device 30 is applied to piezoelectric actuator 32. This voltage displaces diaphragm 33 having piezoelectric actuator 32 disposed thereon to cause diaphragm 33 to project downward and upward.

At this moment, adjacent diaphragm 33 is displaced in an opposite direction to piezoelectric actuator 32 due to a resonance. In other words, diaphragm 33 not having piezoelectric actuator 32 thereon is displaced in the direction different from piezoelectric actuator 32 by 180 degrees.

Thus, in each driver beam 36 having the meander shape, adjacent diaphragm 33 and piezoelectric actuator 32 are displaced in directions from each other by 180 degrees, so that these displacements are accumulated about rotation axis 14, and provide a displacement of movable plate 35.

As discussed above, optical reflecting device 30 includes a pair of driver beams 36 connected to frame 17 at positions opposite to each other with respect to frame 17 to be configured to vibrate to rotate mirror 13 about rotation axis 14, a pair of outer frame pieces 52 that are connected to the pair of driver beams 36 at positions away from rotation axis 14 and extend along frame 17, and a pair of couplers 53a and 53b for coupling the pair of outer frame pieces 52 to frame 17. The pair of couplers 53a and 53b are connected to frame 17 on rotation axis 14.

Exemplary Embodiment 2

Figure 11A:
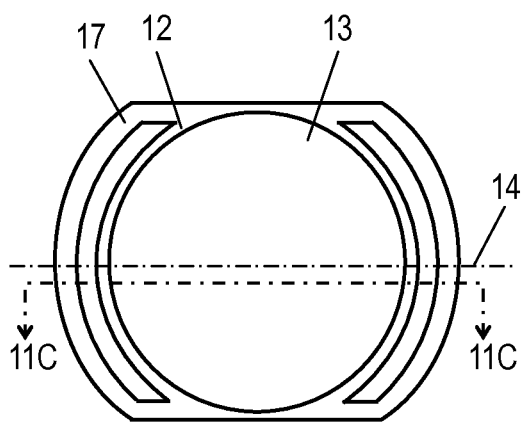
FIG. 11A is an enlarged view of a front surface of a movable plate of an optical reflecting device in accordance with Exemplary Embodiment 2 of the invention.
Figure 11B:
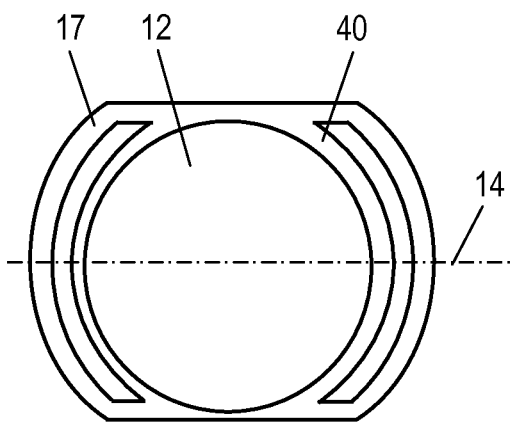
FIG. 11B is an enlarged view of a rear surface of the movable plate shown in FIG. 11A.
Figure 11C:
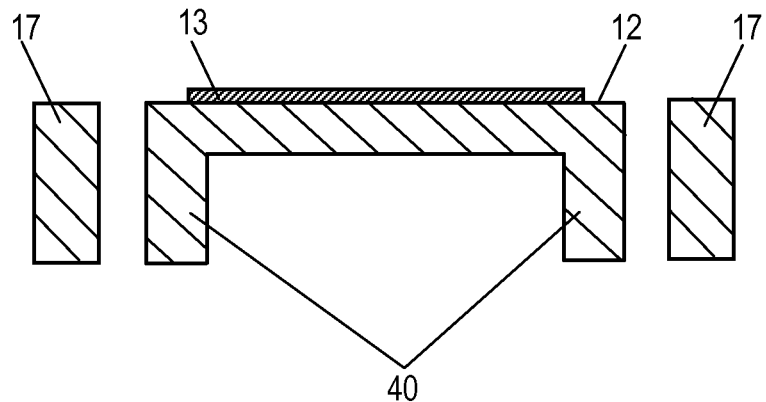
FIG. 11C is a sectional view of the movable plate at line 11C-11C shown in FIG. 11A.
Figure 12A:
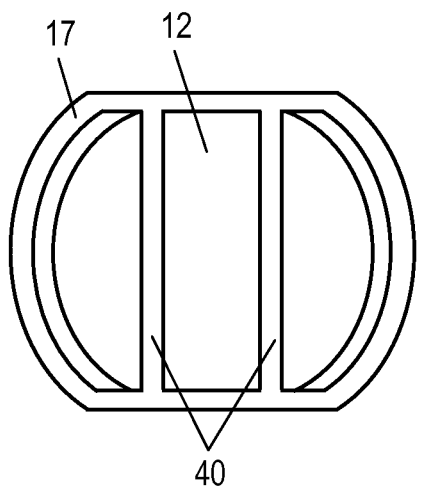
FIG. 12A shows a reinforcing rib of the optical reflecting device in accordance with Embodiment 2.
Figure 12B:
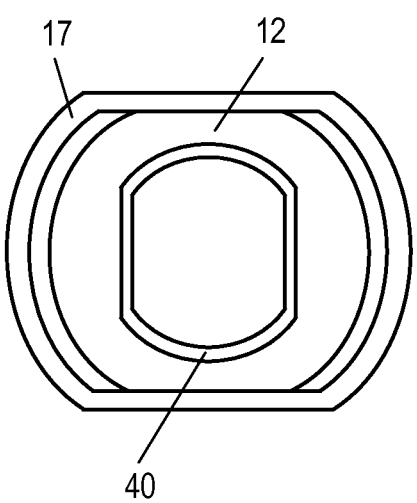
FIG. 12B shows another reinforcing rib of the optical reflecting device in accordance with Embodiment 2.
Figure 12C:
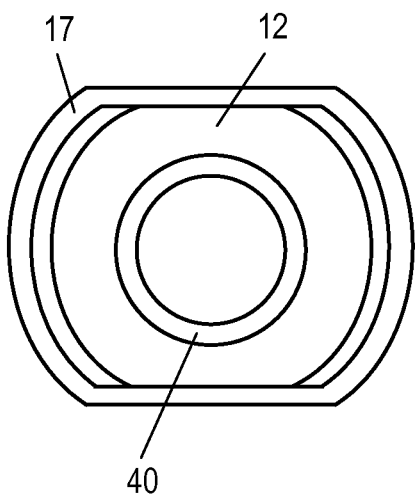
FIG. 12C shows still another reinforcing rib of the optical reflecting device in accordance with Embodiment 2.
Figure 12D:
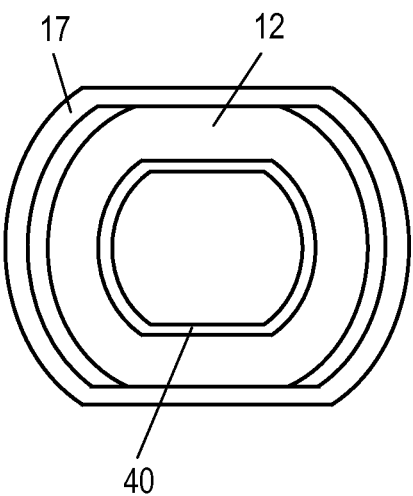
FIG. 12D shows a further reinforcing rib of the optical reflecting device in accordance with Embodiment 2.

FIGS. 11A and 11B are a front view and a rear view of movable plate 12 of an optical reflecting device in accordance with Exemplary Embodiment 2, respectively. FIG. 11C is a sectional view of movable plate 12 at line 11C-11C shown in FIG. 11A. Movable plate 12 according to Embodiment 2 further includes reinforcing rib 40 disposed at an outer periphery of mirror 13. Reinforcing rib 40 is made of material identical to that of frame 17, and has a thickness identical to that of frame 17. The thicknesses of reinforcing rib 40 and frame 17 may be different from each other.

Next, an effect of suppressing the dynamic warp of movable plate 12 according to Embodiment 2 will be described. As shown in FIG. 6B, the amount of the dynamic warp in the direction parallel to rotation axis 14 increases as approaching an edge of ends of mirror 13 from the center of mirror 13. This increase is caused by a phenomenon where the dynamic warp of mirror 13 increases as the position approaches the end of mirror 13 and removed away from support points 28 and 29 of mirror 13. The edge of mirror 13 having a large dynamic warp is supported by reinforcing rib 40, thereby increasing the rigidity of mirror 13, and decreasing the amount of the dynamic warp on the surface of mirror 13 in the direction parallel to rotation axis 14 accordingly.

FIG. 12A to FIG. 12D are rear views of movable plates 12 having reinforcing ribs 40 having other shapes in accordance with Embodiment 2. Reinforcing rib 40 disposed at the edge of mirror 13 enhances the effect. As shown in FIGS. 12A to 12D, however, even if reinforcing rib 40 has a portion away from the edge of mirror 13 or even if reinforcing rib 40 is located away from the edge, reinforcing rib 40 which is located at a position to increases the rigidity of mirror 13 can reduce the dynamic warp of mirror 13.

Exemplary Embodiment 3

FIG. 13 is a plan view of optical reflecting device 130 in accordance with Exemplary Embodiment 3 of the present invention. In FIG. 13, components identical to those of optical reflecting device 30 according to Embodiment 1 shown in FIG. 9 are denoted by the same reference numerals. The optical reflecting device shown in FIG. 13 further includes a pair of outer frame pieces 52 and a pair of couplers 53a and 53b in addition to optical reflecting device 30 according to Embodiment 1 shown in FIG. 9 while movable plates 12 are supported at positions away from rotation axis 14.

In optical reflecting device 130 shown in FIG. 13, each of inner ends of driver beams 36 having meander shapes is connected to respective one of outer frame pieces 52 at positions away from rotation axis 14, respectively.

Figure 14A:
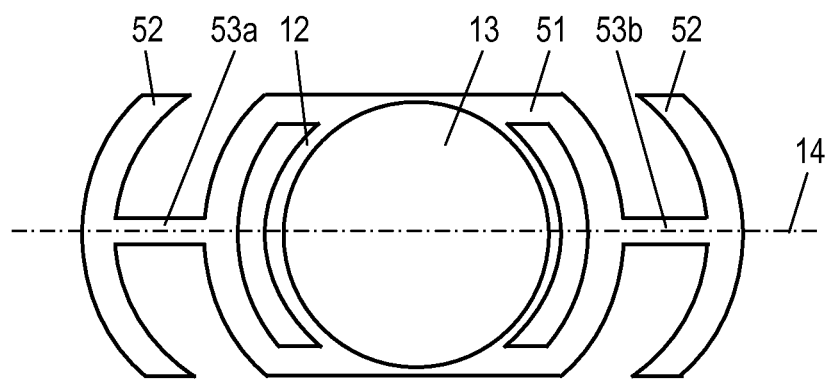
FIG. 14A is a front view of a movable plate of the optical reflecting device in accordance with Embodiment 3.
Figure 14B:
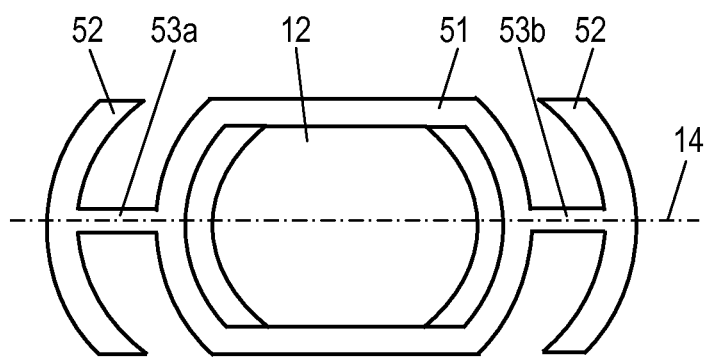
FIG. 14B is a rear view of the movable plate shown in FIG. 14A.

FIGS. 14A and 14B are a front view and a rear view of movable plate 12 in accordance with Embodiment 3, respectively. Movable plate 12 includes mirror 13 and frame 51 that is connected to mirror 13 at connecting parts 15 and 16 to support mirror 13. Frame 51 has a shape similar to that of frame 17 according to Embodiment 1 shown in FIG. 9, and is made of material identical to that of frame 17. Frame 51 is connected to couplers 53a and 53b. Each of couplers 53a and 53b is connected to respective one of outer frame pieces 52. The pair of outer frame pieces 52 for supporting frame 51 with couplers 53a and 53b are supported by the pair of driver beams 36. The centers of couplers 53a and 53b are positioned on rotation axis 14.

Next, an effect of suppressing the dynamic warp of optical reflecting device 130 according to Embodiment 1 will be described.

Figure 15A:
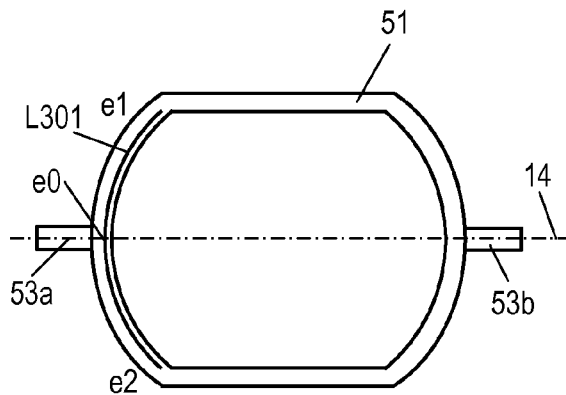
FIG. 15A is a schematic view of a frame of the optical reflecting device in accordance with Embodiment 3.
Figure 15B:
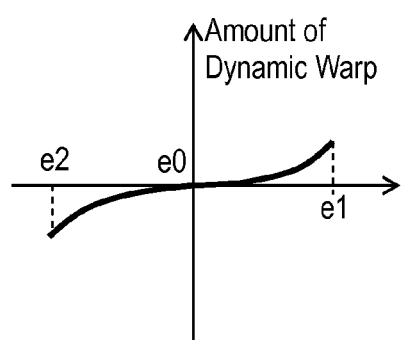
FIG. 15B shows the relationship between positions and a dynamic warp of the frame shown in FIG. 15A.

FIG. 15A is a schematic view of frame 51 in accordance with Embodiment 3. FIG. 15B shows the relationship between positions and a dynamic warp of frame 51 shown in FIG. 15A. Similarly to frame 51 according to Embodiment 1 shown in FIG. 9, frame 51 shown in FIG. 15A is connected to couplers 53a and 53b on rotation axis 14 and is supported by driver beams 36. Frame 51 has edges e1 and e2 on line L301 extending along frame 51. Rotation axis 14 and frame 51 cross at intersection point e0. FIG. 15B shows the amount of the dynamic warp at positions along line L301 of frame 51. As shown in FIG. 15B, the absolute values of the amounts of the dynamic warps at ends e1 and e2 are equal to each other. That is for the following reasons: inertial forces applied to ends e1 and e2 are equal to each other since the distances from rotation axis 14 to ends e1 and e2 are equal to each other; and the dynamic warps at ends e1 and e2 are equal to each other since the distances from connecting part 16 to ends e1 and e2 are equal to each other.

Figure 15C:
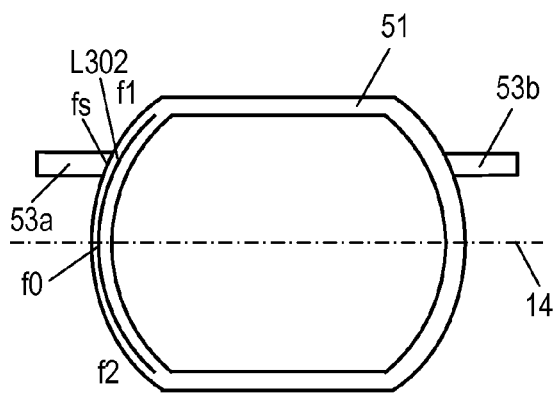
FIG. 15C is a schematic view of a frame of an optical reflecting device of a comparative example.
Figure 15D:
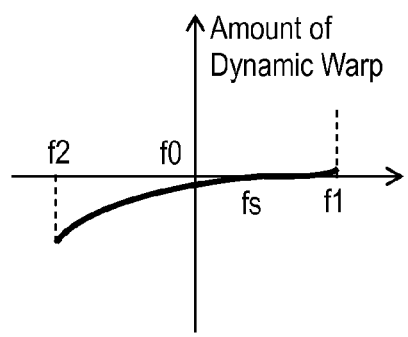
FIG. 15D shows the relationship between positions and dynamic warp of the frame shown in FIG. 15C.

FIG. 15C is a schematic view of frame 51 of a comparative example. FIG. 15D shows the relationship between positions and dynamic warp of frame 51 shown in FIG. 15C. Frame 51 shown in FIG. 15C is connected to couplers 53a and 53b at positions away from rotation axis 14, and is supported by driver beams 36 at positions away from rotation axis 14. Frame 51 has edges f1 and f2 on line L302 extending along frame 51. Rotation axis 14 and frame 51 cross at intersection point f0. Coupler 53a is connected to frame 51 at support point fs. Support point fs is located away from rotation axis 14. As shown in FIG. 15D, the absolute values of the amounts of the dynamic warps at ends f1 and f2 are different from each other. That is for the following reason: inertial forces applied to ends f1 and f2 are equal to each other since the distances from rotation axis 14 to ends f1 and f2 are equal to each other, but the distances from connecting part 16 to ends f1 and f2 are different from each other.

Figure 15E:
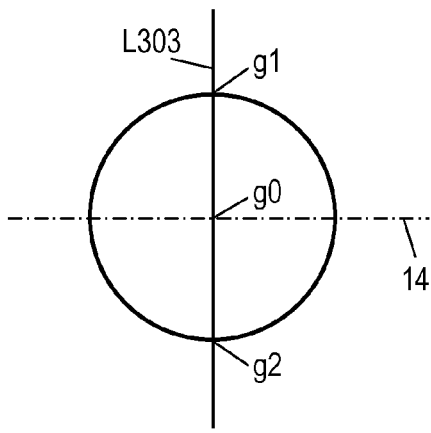
FIG. 15E is a schematic view of a mirror of the optical reflecting device in accordance with Embodiment 3.
Figure 15F:
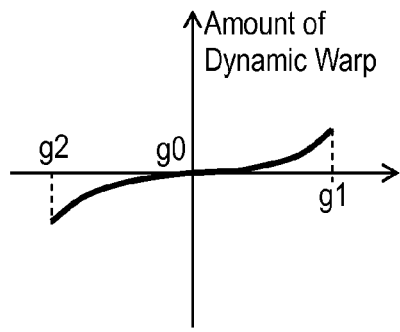
FIG. 15F shows the relationship between positions and dynamic warp of the mirror shown in FIG. 15E.

FIG. 15E is a schematic view of mirror 13 in accordance with Embodiment 3. Mirror 13 has edges g1 and g2 on line L303. Line L303 and rotation axis 14 cross at intersection point g0. FIG. 15F shows the amount of the dynamic warp of mirror 13 shown in FIG. 15E. The optical reflecting devices according to Embodiments 1 to 3 are configured to allow the warp of frame 51 (17) to cancel the warp of mirror 13. As shown in FIG. 15F, the absolute value of the amount of the dynamic warp of mirror 13 at connecting part 15 is equal to that at connecting part 16. Therefore, in order to cause the warp of frame 51 to cancel the warp of mirror 13, the absolute value of the amount of the dynamic warp of frame 51 at connecting part 15 is equal to that at connecting part 16.

In optical reflecting device 130 according to Embodiment 3, frame 51 is supported on rotation axis 14 with the pair of outer frame pieces 52 for supporting frame 51 on rotation axis 14. Thus, the amounts of the dynamic warps of frame 51 at connecting parts 15 and 16 are equal to each other. Therefore, even if driver beams 36 are connected to outer frame pieces 52 at positions away from rotation axis 14, the optical reflecting device provides the effect of suppressing the dynamic warp similarly to optical reflecting device 30 according to Embodiment 1.

The thickness of outer frame pieces 52 may be equal to that of frame 51.

Exemplary Embodiment 4

Figure 16A:
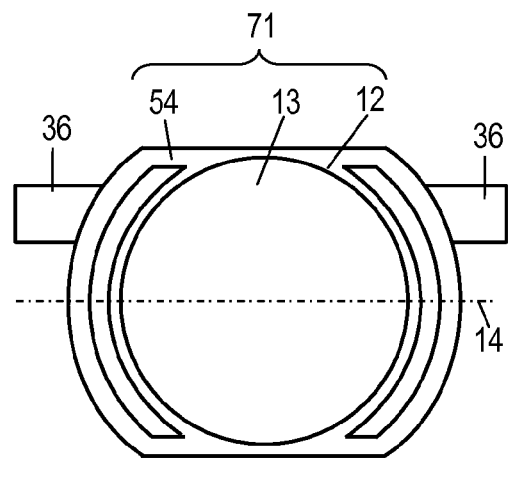
FIG. 16A is a front view of a movable plate of an optical reflecting device in accordance with Exemplary Embodiment 4 of the invention.
Figure 16B:
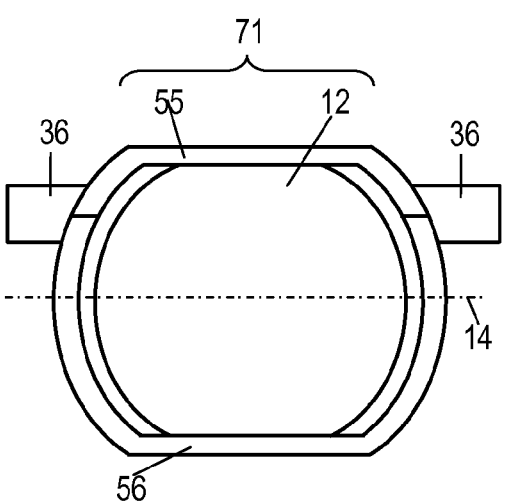
FIG. 16B is a rear view of the movable plate shown in FIG. 16A.

FIGS. 16A and 16B are a front view and a rear view of movable plate 71 of an optical reflecting device in accordance with Exemplary Embodiment 4 of the present invention. In FIGS. 16A and 16B, components identical to those of optical reflecting device 30 according to Embodiment 1 shown in FIG. 9 are denoted by the same reference numerals. Movable plate 71 according to Embodiment 4 includes frames 54 and mirror 13. Mirror 13 is connected to frame 54 to be supported by frames 54 at connecting parts 55 and 56 that are disposed at the same positions as those of connecting parts 15 and 16 according to Embodiment 3. Frame 54 is connected to driver beams 36 to be supported by driver beams 36 at positions away from rotation axis 14.

In movable plate 71 according to Embodiment 4, unlike Embodiment 3, the thickness of connecting part 55 is different from that of connecting part 56 in order to distribute the dynamic warp of each frame 54 symmetrically to each other with respect to rotation axis 14. Variations of the dynamic warp produced due to a variation of distances from positions connected to driver beams 36 can be changed to be symmetrical to each other with respect to rotation axis 14 by causing thicknesses, i.e., rigidities at portions on frame 54 to be different from each other.

Figure 17A:
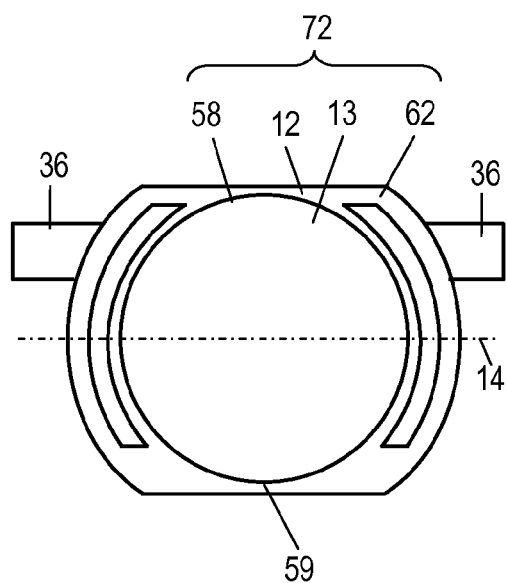
FIG. 17A is a front view of another movable plate of the optical reflecting device in accordance with Embodiment 4.
Figure 17B:
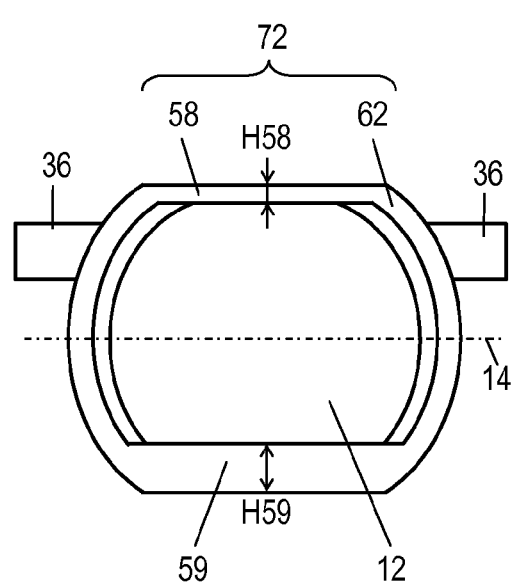
FIG. 17B is a rear view of the movable plate shown in FIG. 17A.

FIGS. 17A and 17B are a front view and a rear view of another movable plate 72 of the optical reflecting device in accordance with Embodiment 4 of the present invention. In FIGS. 17A and 17B, components identical to those of movable plate 71 shown in FIGS. 16A and 16B are denoted by the same reference numerals. Movable plate 72 shown in FIGS. 17A and 17B includes, instead of connecting parts 55 and 56, connecting parts 58 and 59 that are disposed at the same positions as those of connecting parts 55 and 56. Mirror 13 is connected to frame 54 to be supported by frames 54 at connecting parts 58 and 59 that are disposed at the same positions as those of connecting parts 15 and 16 according to Embodiment 3. Connection width H58 which is the width of connecting part 58 in the direction perpendicular to rotation axis 14 is different from connection width H59 which is the width of connecting part 59. Therefore, the area of the part where connecting part 58 overlaps mirror 13 and is connected to mirror 13 is different from the area of the part where connecting part 59 overlaps mirror 13 and is connected to mirror 13. Connecting part 58 is closer to driver beams 36 than connecting part 59 is. Connection width H58 of connecting part 58 is smaller than connection width H59 of connecting part 59. This configuration can control the amount of the warp of frame 62 transmitting to mirror 13, and simultaneously cancels the dynamic warps at connecting parts 58 and 59 between frame 62 and mirror 13.

INDUSTRIAL APPLICABILITY

An optical reflecting device according to the present invention allows a mirror to reflect light without warp, being applicable to a small projector or a head-mounted display.

REFERENCE MARKS IN THE DRAWINGS

13 Mirror
14 Rotation Axis
15 Connecting Part (First Connecting Part)
16 Connecting Part (Second Connecting Part)
17 Frame
11a, 11b Driver Beam
36 Driver Beam
40 Reinforcing Rib
52 Outer Frame Piece
53a, 53b Coupler
55 Connecting Part (First Connecting Part)
56 Connecting Part (Second Connecting Part)
58 Connecting Part (First Connecting Part)
59 Connecting Part (Second Connecting Part)

The invention claimed is:

1. An optical reflecting device comprising:
a mirror;
a frame connected to the mirror at a first connecting part and a second connecting part that are opposite to each other such that the mirror is located between the first connecting part and the second connecting part; and
a pair of driver beams coupled to the frame and located opposite to each other with respect to the frame such that the frame is provided between the pair of driver beams, the driver beams being configured to vibrate to rotate the mirror about a rotation axis,
wherein rigidity of the frame is higher than rigidity of the mirror, and
wherein the rotation axis is perpendicular to a line that connects the first connecting part to the second connecting part.

2. The optical reflecting device according to claim 1, wherein the mirror is formed integrally with the frame via the first connecting part and the second connecting part.

3. The optical reflecting device according to claim 1, wherein the mirror has a front surface for reflecting light and a rear surface opposite to the front surface, the optical reflecting device further comprising a reinforcing rib disposed on the rear surface of the mirror.

4. The optical reflecting device according to claim 1, wherein the pair of driver beams are connected to the frame.

5. The optical reflecting device according to claim 4, wherein the pair of driver beams are connected to the frame on the rotation axis.

6. The optical reflecting device according to claim 1, further comprising:
a pair of outer frame pieces each disposed between the frame and respective one of the driver beams and connected to respective one of the driver beams at a position located away from the rotation axis, the outer frame pieces extending along the frame; and
a pair of couplers each disposed between the frame and respective one of the driver beams to couples the frame to respective one of the pair of outer frame pieces.

7. The optical reflecting device according to claim 6, wherein the pair of couplers are connected to the frame on the rotation axis.

8. The optical reflecting device according to claim 1,
wherein the driver beams are connected to the frame at positions away from the rotation axis, and
wherein rigidity of the first connecting part is different from rigidity of the second connecting part.

9. The optical reflecting device according to claim 1,
wherein the driver beams are connected to the frame at positions away from the rotation axis, and
wherein an area of the first connecting part where the mirror is connected to the frame is different from an area of the second connecting part where the mirror is connected to the frame.

* * * * *